May 23, 1950  T. SLONCZEWSKI  2,508,547
CALIBRATION SYSTEM
Filed July 27, 1948
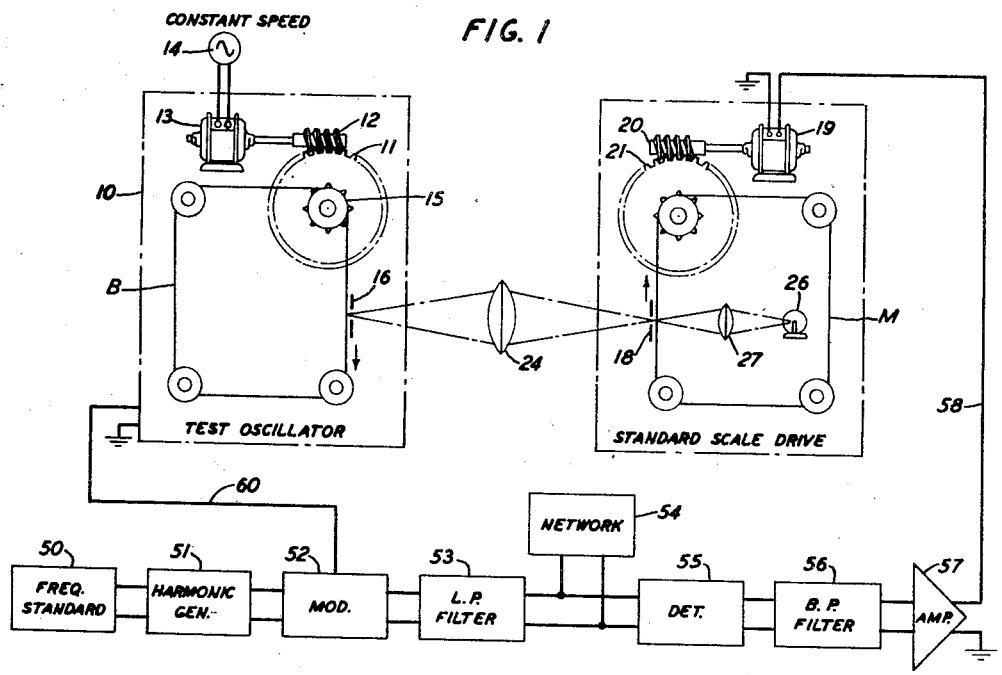
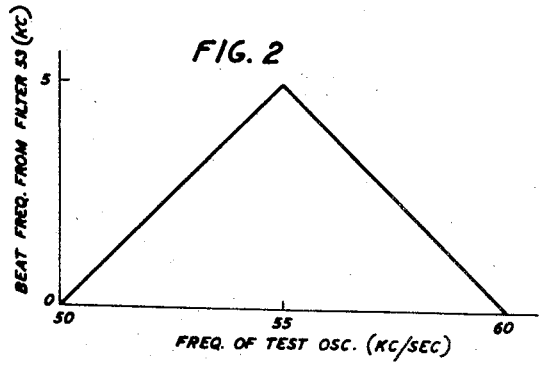
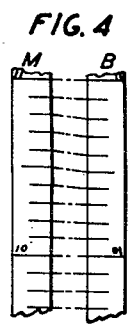
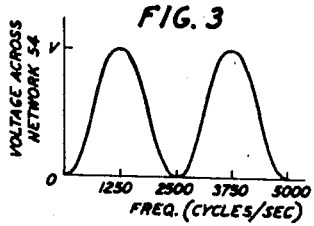
INVENTOR
T. SLONCZEWSKI
BY
D. Mackenzie
AGENT Patented May 23, 1950

2,508,547

UNITED STATES PATENT OFFICE 2,508,547

CALIBRATION SYSTEM

Thaddeus Slonczewski, Summit, N. J., assignor to Bell Telephone Laboratories, Incorporated, New York, N. Y., a corporation of New York Application July 27, 1948, Serial No. 40,872

4 Claims. (Cl. 175—183)

This invention relates to an improvement in calibration systems, providing a system of apparatus for the automatic calibration of a high frequency electric oscillator by direct comparison with a precision frequency standard.

In United States Patent 2,275,977, granted March 10, 1942 to W. J. Means and T. Slonczewski, there is disclosed a system for the automatic calibration of a test oscillator by comparison with a standard oscillator which has itself previously been calibrated against a frequency standard. The present invention is an improvement over the system there disclosed in that by comparing the test oscillator output directly with that of a primary frequency standard, the errors which may have crept into the calibration of the standard oscillator are avoided.

The principal object of the invention is, therefore, to provide a novel arrangement of apparatus whereby the frequency calibration of a test oscillator is automatically obtained by direct comparison with a primary frequency source of high precision.

The system of the invention permits accurate calibration of the test oscillator, a heterodyne oscillator, for example, having 2000 calibrating marks, say from 50 kilocycles to 20 megacycles, continuously in an interval of less than five minutes. To provide means for accurate automatic calibration of an oscillator at that rate, with the consequent saving of time and effort, is another object of the invention.

The frequency-determining element of an electrical oscillator is usually in the form of a variable condenser, and the variation is accomplished by a rotating element connected to one plate of the condenser. Ideally, a specific angular motion of the rotating element produces always the same change in the generated frequency. As described in the above-mentioned Patent 2,275,977, it is convenient to print, photographically or otherwise, the scale divisions of a master scale on a blank scale driven with the frequency-determining element of the test oscillator. If the frequency of the test oscillator varied linearly with the angular position of the frequency-varying element it would be possible to drive both the master and the blank scale at constant speed, the divisions of the master scale having been drawn thereon at uniform spacing. In the actual case the curve of frequency versus angular position of the test oscillator departs more or less from a straight line and one scale or the other must be driven at correspondingly varying speed.

In the present invention the blank scale and the frequency-determining element of the test oscillator are driven synchronously and at constant speed. The scale divisions of the master scale are drawn uniformly spaced thereon and a novel arrangement is employed to supply to a synchronous motor a voltage of frequency proportional to the time rate of change of frequency of the test oscillator with angular rotation of the frequency-determining element thereof. The synchronous motor so controlled drives the master scale always at such a rate that the divisions on the master scale keep pace with the change in frequency of the test oscillator.

Certain elements, fully described in Patent 2,275,977, are incorporated in the system of the present invention for the same purpose as in the patent referred to, with the disclosure of which the reader is assumed to be familiar.

The invention will be fully understood from the following description, read with reference to the accompanying drawing in which:

Fig. 1 is a block schematic diagram of the complete system;

Fig. 2 shows the variation in frequency of the output voltage of the modulator of Fig. 1;

Fig. 3 shows the variation in amplitude of the voltage across the shaping network of Fig. 1; and Fig. 4 shows in comparison the uniformly graduated scale M used, and the calibrated scale B produced by the invention.

The heterodyne oscillator it is desired to calibrate may be of any known type, such as that described in my United States Patent 2,252,870, August 19, 1941. In such an oscillator the output frequency is produced by beating the output of a fixed oscillator circuit against that of a variable oscillator. To adjust at a given setting the frequency of such an oscillator, it is known to provide a sharply tuned circuit responsive, either maximally or minimally, to the frequency desired; a screwdriver adjustment of the variable oscillator is then made to obtain from the tuned circuit a maximum or minimum response, as the case may be, whereupon the setting of the heterodyne oscillator is established for the desired frequency. As will later appear, this is the final step in the practice of the present invention.

Referring now to Fig. 1, the heterodyne oscillator under test is indicated by numeral 10. The frequency-determining element, not shown, of oscillator 10 is a condenser the capacity of which is varied by the rotation of a condenser plate controlled by the motion of wormwheel 11; this is driven at constant angular speed through wormgear 12 by synchronous motor 13, supplied from a convenient source 14 of constant frequency.

On the shaft of wormwheel 11 is fixed sprocket 15, driving at constant linear speed through suitable perforations a blank scale B, preferably an unexposed photographic film on which graduations are to be printed through aperture 16. Film 13 is shown for convenience as an endless loop; it may of course be of any length desired and be operated between feed and take-up reels.

Aperture 16 is a slit of which the long dimension is at right angles to the direction of travel of scale B. Behind a corresponding aperture 18 there is carried a transparent master scale M, driven as later explained by synchronous motor 19 through worm 20, wormwheel 21 and sprocket 22 which engages suitable perforations in scale M. An optical system, symbolized by lens 24, images graduations, transversely drawn with uniform longitudinal spacing on scale M, on the corresponding areas of scale B as the two scales are simultaneously progressed past the respective apertures by motors 13 and 19. The rate of progress of scale B is uniform, while that of scale M is subject to variation as will presently be explained. It is understood that the elements so far described are protected from light, except that of lamp 26 which is focussed by lens 27 on scale M and thus enables the graduations on scale M to be photographed on scale B.

The foregoing description of the operation of scales B and M by motors 14 and 19 is adapted from the complete description of the similar operation of like-named scales given in Patent 2,275,977, to which the reader is referred for an account of the various alternative arrangements possible.

Suppose it is desired to calibrate scale B in frequency intervals of 10 kilocycles per second, from 50 kilocycles to 20 megacycles per second. Scale divisions are drawn on master scale M with uniform spacing. By suitable design of optical system 24 this spacing may be repeated with any desired magnification (or reduction) in the spacing on scale B of the images of these divisions. The spacing on scale M and the constant of the optical system will of course be chosen to space the images on scale B correspondent to the frequency interval of 10 kilocycles per second. As explained in Patent 2,275,977, the variation in frequency of oscillator 10 with rotation of its frequency-determining element is not perfectly uniform, and means must be employed to insure that consecutive 10-kilocycle marks on scale M appear behind aperture 18 only when consecutive 10-kilocycle intervals are passed in the frequency of oscillator 10.

Fig. 4 shows, for comparison, scale M with uniformly spaced divisions and scale B after exposure and development. Scale B is for better comparison inverted relatively to scale M. On the two scales graduations 40 and 41 are aligned, while intervening graduations are spaced uniformly on scale M but irregularly on scale B. These scales may be of the type disclosed in my United States Patent 2,058,641, October 27, 1936.

In Patent 2,275,977 above-mentioned, there is disclosed a means for calibrating scale B driven, as here, at constant speed with the frequency-determining element of a test oscillator, with reference to a scale M driven at suitably varying speed with the corresponding element of a standard oscillator. On scale B when developed are perpetuated the calibration errors of the standard oscillator. That standard oscillator is in the present invention replaced by a precision frequency standard 50, which may be that described by W. A. Marrison, "High precision standard of frequency," Bell system Technical Journal, vol. VIII, page 493, 1929. Marrison there describes an apparatus providing, at high precision, frequencies in decade steps from 10 to 100,000 cycles per second.

Conveniently, the selected output frequency of precision frequency standard 50 is 10 kilocycles per second. This is impressed on harmonic generator 51, which produces on its output with uniform amplitude the odd and even harmonics, up to 20 megacycles per second, of the 10 kilocycle impressed frequency. To this purpose there may be adapted the harmonic producer disclosed in United States Patent 2,146,091, February 7, 1939, to E. Peterson.

Harmonic generator 51 provides a spectrum of the harmonics of 10 kilocycles. These harmonics are uniform in amplitude and are all together impressed on one input of ring modulator 52, which preferably is of the design shown in United States Patent 2,025,158, December 24, 1935 to F. A. Cowan. To the other input of modulator 51, there is applied via conductor 55 the output voltage of test oscillator 10, of frequency determined by the angular position of the frequency-determining element of the test oscillator.

Suppose the frquency generated by oscillator 10 is 50 kilocycles. The output of modulator 52 then contains beat frequencies at 10-kilocycle intervals, but zero output of 50 kilocycles. Let the motor 14 now drive wormwheel 11 to shift the test oscillator frequency to 55 kilocycles; there result in the output of modulator 52, frequencies of 5 kilocycles (55—50 or 60—55) and others of 15, 25, etc., kilocycles. As the test oscillator changes to generate 60 kilocycles, there are beats 10 kilocycles apart but no output at 60 kilocycles.

For a purpose presently explained, the output of modulator 52 is filtered by a low-pass filter 53, having a cut-off frequency of 4,500 to 5,000 cycles. Then, in each change of 10 kilocycles in the frequency of oscillator 10, the beat frequency passed by filter 53 varies from zero through 5 kilocycles and back to zero, as shown in Fig. 2.

The beat frequencies, when any such are passed by filter 53, are of uniform amplitude since the output frequencies of oscillator 10 and the harmonics produced by generator 51 have such uniformity. The output passed by filter 53 is of constant amplitude and of frequency modulated during each 10-kilocycle interval as shown in Fig. 2.

If the cut-off of filter 53 is as low as 4,500 cycles, no harm results because amplitude modulation is now effected by shunting the filter output by a two-terminal network 54. Network 54 is an artificial line designed to have an input impedance zero at frequencies zero, 2,500 and 5,000 and a maximum at 1,250 and 3,750, cycles per second. Such an artificial line may be designed in accordance with the precepts stated by R. M. Foster, "A reactance theorem," Bell System Technical Journal, vol. III, page 259, 1924.

In the course of a 10-kilocycle variation in the frequency generated by oscillator 10, say from 50 to 60 kilocycles, the output frequency passed by filter 53 varies from zero to 5,000 cycles and back to zero with an amplitude varying from zero to maximum at 1,250, zero at 2,500, maximum at 3,750, zero again at 5,000 cycles, and the same amplitude variation as the filter output frequency falls from 5,000 cycles to zero. Thus in each 10-kilocycle interval of oscillator 10, there appears across the input terminals of network 54 a voltage varying in frequency and in amplitude, the latter through four cycles.

It is convenient so to choose the gearing driving the frequency-determining element of oscillator 10 that the generated frequency varies 75 kilocycles per second. Then the voltage amplitude across network 54 varies through 30 cycles per second.

The frequency variation in this voltage is now removed by detector 55, of any suitable design, to deliver a 30-cycle voltage then passed through filter 56, passing a narrow band of frequencies, the band center being at 30 cycles. This 30-cycle voltage is then amplified as needed by amplifier 57, of which the output is applied by conductor 58 to drive motor 19.

Master scale M is graduated with uniform spacing and is driven by synchronous motor 19 at a speed proportional to the frequency of the voltage on conductor 58. This frequency is itself proportional to the time rate of change of frequency generated by oscillator 10, wherefore the consecutive graduations on scale M succeed one another behind aperture 18 in the time interval of 10-kilocycle change in frequency of the test oscillator.

It will be observed that motor 14 drives gears 11 and 12 at constant angular speed and unexposed film B at constant linear speed. The rate of change of frequency of oscillator 10 is also nominally constant, say 75 kilocycles per second, resulting in a voltage of frequency of 30 cycles per second to drive motor 19. In any actual heterodyne oscillator, the frequency change per unit angular rotation of the frequency-determining element is not precisely constant, wherefore the scale graduations photographed on scale B are not uniformly spaced when correctly corresponding each to the actual oscillator frequency.

If the frequency change per second is less or greater than the nominal value, the voltage on conductor 58 will be lower or higher in frequency and master scale M will move accordingly slower or faster behind aperture 18. Then consecutive graduations on scale M will always appear behind aperture 18 when the proper transverse element of scale B is exposed behind aperture 16. Illustratively only, Fig. 1 shows by arrows the motions of the two scales when the simplest type of optical system is used.

When scale B is developed, the graduations photographed thereon are correctly spaced, but it is not at once known where to affix the scale to the oscillator. This is found by applying the scale in such a position that a selected graduation, say 100 kilocycles, is correspondent to an oscillator setting known to produce a frequency of very nearly 100 kilocycles. At this setting, the oscillator output voltage is impressed on a sharply tuned circuit accurately designed to pass (or suppress) 100 kilocycles. The output of the tuned circuit is measured and, by adjustment of the variable oscillator in the heterodyne oscillator circuit, is made a maximum (or minimum). This adjustment is always a minute correction and when it is made the affixed scale correctly indicates the setting for the frequency of adjustment and the other graduations are necessarily properly located with reference to this frequency.

The application of the invention to the calibration of oscillators of other types is obvious, that of a heterodyne oscillator being only an illustration.

What is claimed is:

1. Apparatus for the automatic calibration, in terms of a standard frequency, of an electrical oscillator generating a voltage of variable frequency, comprising a source of voltage of standard frequency, a blank scale to be graduated in multiples of said frequency, means for continuously varying the frequency of the generated voltage and concomitantly progressing the blank scale at uniform linear speed, a standard scale marked at uniform linear spacing with designations in terms of the standard frequency, means controlled jointly by the voltage of standard frequency and the generated voltage for progressing the standard scale at a linear speed proportional to the time rate of change of frequency of the generated voltage and means for registering on the blank scale the successive designations of the standard scale at locations on the blank scale successively corresponding to generated frequencies identical with those marked on the standard scale.

2. Apparatus for the automatic frequency calibration of an electrical oscillator with reference to a standard of precision frequency comprising a source of voltage of precision frequency, means for deriving from the source a plurality of voltages of frequencies equal to the standard frequency and the harmonics thereof, a blank scale to be graduated in frequency intervals equal to those of the harmonics, means for continuously varying the frequency of the voltage generated by the oscillator and concomitantly progressing the blank scale at uniform linear speed, modulator means for combining the generated voltage and the derived voltages to provide voltages of the difference frequencies between the generated frequency and the harmonic frequencies, a filter selecting from the provided voltages those of frequency lying between zero and one-half the harmonic interval whereby in each change of generated frequency through one-half the harmonic interval the selected frequency varies between zero and one-half the frequency interval, an electrical network shunting the filter and having an impedance varying with frequency through a whole number of cycles in each said change of generated frequency whereby the amplitude of the selected voltage varies cyclically proportionally to the time rate of change of generated frequency, means including detector means for deriving from the selected voltage so varied an alternating voltage of frequency proportional to said time rate, a standard scale bearing uniformly spaced frequency designations, means controlled by the alternating voltage for progressing the standard scale at a linear speed proportional to said time rate and means for successively reproducing the designations of the standard scale on the blank scale at locations on the latter corresponding to generated frequencies individually equal to those designated on the standard scale.

3. Apparatus as in claim 2 wherein the blank scale is an unexposed photographic film and the designation-reproducing means includes an optical system whereby the designations on the standard scale are imaged on the respectively corresponding elements of the blank scale.

4. Apparatus as in claim 3 wherein the controlled means includes a band-pass filter of which the pass-band includes the average frequency of the alternating voltage.

THADDEUS SLONCZEWSKI.

No references cited.